Jan. 26, 1960    C. O. LANCIANO, JR    2,922,667
TELESCOPIC HOSE UNIT AND COUPLING THEREFOR
Filed Oct. 13, 1958
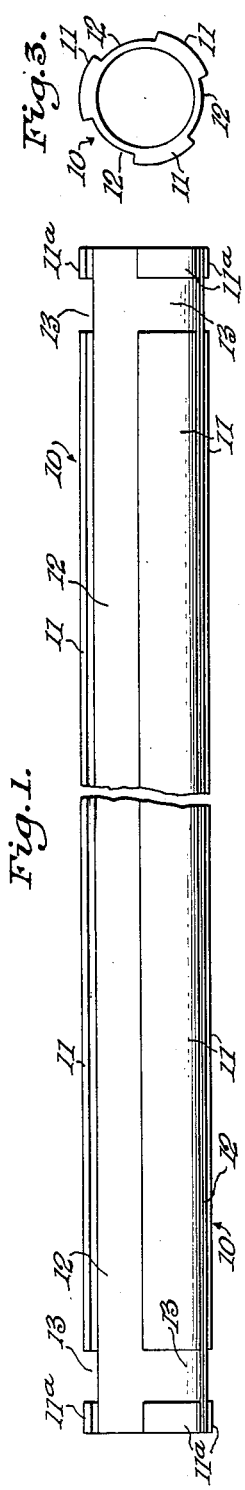
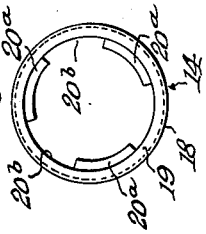
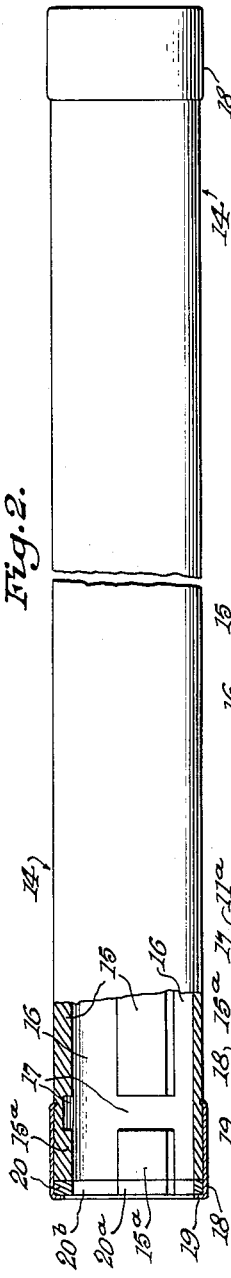
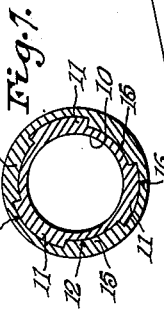
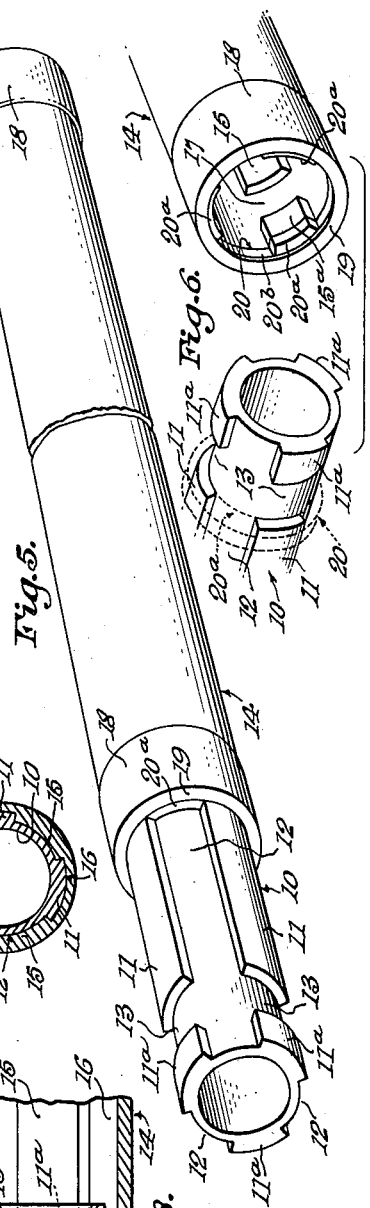
INVENTOR.
CLAUDE O. LANCIANO, JR.
BY
ATTORNEYS United States Patent Office 2,922,667
Patented Jan. 26, 1960

2,922,667

TELESCOPIC HOSE UNIT AND COUPLING THEREFOR

Claude O. Lanciano, Jr., Coke, Va., assignor to the United States of America as represented by the Secretary of the Army Application October 13, 1958, Serial No. 767,069

5 Claims. (Cl. 285—260)

(Granted under Title 35, U.S. Code (1952), sec. 266)

The invention described herein may be manufactured and used by or for the Government for governmental purposes without payment of any royalty thereon.

This invention relates to a new and improved portable telescoping, flexible hose unit adapted to be expeditiously coupled at each end to like hose units to form a continuous hose of any desired length.

The object of this invention is to provide a standardized hose unit suitable for fluid transportation which can be connected end-to-end with like units to form a continuous conduit.

Another object of this invention is to provide a hose unit which can be telescopically retracted to approximately half its usable length for convenient transportation and storage.

A further object of this invention is to provide a fluid-tight hose coupling using no cam or lever seating means and therefore requiring a minimum of time and effort and requiring no additional parts or tools for connection and disconnection.

Still another object of the present invention is to provide a novel tubular hose construction with increased resistance to pressures tending to collapse the hose.

Additional objects and advantages of this invention will be apparent from the following detailed description of the chosen embodiment and the accompanying drawings wherein—

Fig. 1 is a side or longitudinal view of the inner tubular member;

Fig. 2 is a side or longitudinal view, partially broken away, of the outer tubular member;

Fig. 3 is an end view of the inner tubular member of Fig. 1;

Fig. 4 is an end view of the outer tubular member of Fig. 2;

Fig. 5 is a perspective view of the inner and outer tubular members in telescoping engagement, with the inner tube partially extended;

Fig. 6 is a perspective view showing the male and female ends and sealing ring which make a fluid-tight joint;

Fig. 7 is a sectional view showing the inner tube in telescopic engagement with the outer tube; and Fig. 8 is a detailed vertical sectional view showing the structure of the fluid-tight joint between hose units.

Referring to the drawings, each standard hose unit is comprised of essentially four parts, the inner tubular member 10, the outer tubular member 14, and two resilient sealing rings 20, one ring adjacent each end of the outer tube 14.

The inner tubular member 10 is preferably constructed of resilient material, such as reinforced rubber, and has a wall of sufficient thickness and rigidity to prevent collapsing under atmospheric pressure when the hose is connected to the intake side of a fluid pump. In the illustrated embodiment of the invention, the inner tube 10 has three longitudinally extending ribs 11 radially disposed as shown in Fig. 3, thereby forming three longitudinal grooves 12. As shown, each groove 12 and rib 11 intercepts a radial angle of approximately 60°. Adjacent each end of inner tube 10 are circumferential grooves 13 of the same depth as longitudinal grooves 12 which intersect ribs 11 to form rib-segments 11a.

The outer tubular member 14 is also preferably constructed of resilient material and is approximately the same length as the inner tube and has an internal configuration complementary to the inner tube 10 so that the inner tube can be received in close-fitting, telescopic engagement. That is, the outer tube 14 has three inwardly protruding ribs 15 adapted to fit in the grooves 12 of the inner tube 10 and three longitudinal grooves 16 adapted to receive the ribs 11 of the inner tube, as illustrated in Fig. 7. Adjacent each end of the outer tube 14 is a circumferential groove 17 of the same depth as longitudinal grooves 16. The groove 17 is just wide enough to receive rib-segments 11a in close-fitting engagement. The groove 17 is spaced from the end of outer tube 14 so as to form rib-segments 15a of a length which can be received in close-fitting engagement with the circumferential grooves 13 of the inner tube 10.

A flanged sleeve 18 is securely crimped into the rubber at each end of the outer tubular member as shown in Fig. 8, and the flange 19 of each sleeve retains a resilient sealing ring 20 in coaxial alignment with the outer tube. Sealing ring 20 is of the same cross-sectional configuration as outer tube 14 thereby having protruding ribs 20a and grooves 20b, and is free to rotate independent of the outer tube.

When being transported or stored, the inner tube 10 is completely received in the outer tube 14, giving a retracted length equal to the outer tube alone. A convenient length for the outer tube is approximately five feet. When the hose is in use, however, the inner tube is extended until the rib-segments 11a of the inner tube are aligned with the circumferential groove 17 of the outer tube and consequently the rib-segments 15a of the outer tube are aligned with the circumferential groove 13 of the inner tube. The inner tube is then rotated approximately 60° so that the rib-segments are received in the circumferential groove aligned therewith to give an interlocking joint which prevents separation of the two tubular members. However, in this interlocking position the longitudinal grooves of the inner tube are aligned with the longitudinal grooves of the outer tube to produce a gap in the joint indicated at 21, Fig. 8. The sealing ring 20 closes this gap since the ribs 20a are always retained in the longitudinal grooves 12 of the inner tube and therefore rotate 60° with the inner tube when the interlocking connection is made. The inner tube, the outer tube, and the seal ring then cooperate to give a fluid-tight seal. Both the inner and outer tubes have duplicate structure at each end so that any number of standardized units can be connected end-to-end to form a hose of any desired length.

Several advantages of the above described device are not readily apparent. In the coupling, for example, it will be noted that no cams or wedges exert sealing forces on any of the sealing surfaces. But the inner tube, the outer tube, and sealing ring are all preferably constructed of a resilient material and cooperate in close-fitting engagement to give two abutting resilient materials which seal all avenues of escape. Thus having only a resilient material in close-fitting, sliding contact with another resilient material without a camming means to seat the two together has been found sufficient and desirable in practice. Another feature is that the coupling has no parts, either on the inner tube or the outer tube, which protrude from the normal cross-sectional configuration of the two tubes. This feature allows in a telescoping unit, the maximum actual conduit size in any given external diameter size because all available space between the two tubes is occupied by tube material which contributes to the required rigidity of the tubes. Further, the outer tube has no protruding parts, other than the thin, flanged collar, which will in any way interfere with handling or stacking for storage.

A requirement of the hose is to be able to withstand atmospheric pressure without collapsing when used as a suction hose. Although any number of ribs could be used, it is advantageous to use three to save fabrication material. Each rib is essentially a reinforced arch which resists bending toward its center. By using three such arches, a structure similar to a triangular truss is formed the structural advantages of which are well known. By taking advantage of this triangular construction, the required thickness of the hose is reduced, thereby saving on fabrication materials.

It will also be noted that the inner tube can be extended in either direction and can be coupled with either end of the outer tube. This is a convenient and time saving feature when laying out the hose units prior to connection, because it is immaterial in what direction the unit is laid as compared with normal hose units having a male and female end which accordingly dictates which end must be connected to the preceding unit of the series.

I claim:

1. A hose unit comprising an outer tube, an inner tube received into the outer tube and having a plurality of longitudinally extending, outwardly projecting ribs radially disposed and separated one from the other by longitudinally extending grooves, said inner tube also having a circumferential groove adjacent each end thereof intersecting said longitudinally extending ribs and grooves to form rib-segments between said circumferential grooves and the adjacent end of said inner tube, the outer tube having a number of longitudinally extending grooves on the inside surface thereof equal to the number of said outwardly projecting ribs of said inner tube and radially disposed in a pattern and of cross-sectional size and configuration to receive said longitudinal ribs of said inner tube in close-fitting, sliding engagement, said longitudinally extending grooves of said outer tube being separated one from the other by a plurality of longitudinally extending, inwardly projecting ribs radially disposed and of cross-sectional size and configuration to be received in close-fitting, sliding engagement in said longitudinally extending grooves of said inner tube, said outer tube also having a circumferential groove adjacent each end thereof intersecting said inwardly projecting ribs thereby forming rib-segments of the same longitudinal length and cross-section as that of said circumferential grooves of said inner tube whereby said outer tube rib-segments are adapted to be received in close-fitting sliding engagement with said circumferential grooves of said inner tube, said circumferential grooves of said outer tube being of sufficient longitudinal length to receive said rib-segments of said inner tube, a pair of annular rings of internal size and configuration to receive said inner tube in close-fitting, sliding engagement, adjacent each end of said outer member, and means on said outer tube holding said rings in coaxial alignment with and in close-fitting sliding engagement with said outer tube whereby said rings receive said inner tube and are rotatable therewith.

2. A hose unit as set out in claim 1 wherein the number of said longitudinally extending ribs on said inner tube is three.

3. A hose unit as set out in claim 1 wherein said inner tube, said outer tube, and said rings are each fabricated of a resilient material.

4. A hose coupling comprising a male member having a plurality of longitudinally extending, outwardly projecting ribs radially disposed and separated one from the other by longitudinally extending grooves, said male member also having a circumferential groove intersecting said outwardly projecting ribs at right angles thereto to form rib-segments between said circumferential groove and the penetrating end of said male member, said male member being received in a female member having a number of longitudinally extending grooves on the internal surface thereof equal to the number of said outwardly projecting ribs of said male member and radially disposed in a pattern and of cross-sectional size and configuration to receive said longitudinal ribs of said inner tube in close-fitting, sliding engagement, said longitudinally extending grooves of said female member being separated one from the other by a plurality of longitudinally extending, inwardly projecting ribs radially disposed and of cross-sectional size and configuration to be received in close-fitting, sliding engagement in said longitudinally extending grooves of said male member, said female member also having a circumferential groove adjacent the receiving end thereof intersecting said inwardly projecting ribs at right angles thereto thereby forming rib-segments of the same longitudinal length and cross-section as that of said circumferential groove of said male member whereby said rib-segments of said male member are adapted to be received in close-fitting, sliding engagement with said circumferential groove of said female member, said circumferential groove of said male member being of sufficient longitudinal length to receive said rib-segments of said female member, an annular ring having an internal size and configuration to receive said male member in close-fitting, sliding engagement, and means on said female member holding said ring in coaxial alignment with and in close-fitting, sliding engagement with said female member whereby said ring receives said male member and is rotatable therewith.

5. A hose coupling as set out in claim 4 wherein said male member, said female member, and said ring are each fabricated of a resilient material.

References Cited in the file of this patent

UNITED STATES PATENTS

| 193,686 | Bowers | July 31, 1877 |
| 825,810 | Cooke | July 10, 1906 |
| 1,365,851 | Reynolds | Jan. 18, 1921 |
| 1,608,772 | Cole | Nov. 30, 1926 |
| 2,271,931 | Williamson | Feb. 3, 1942 |

FOREIGN PATENTS

| 405,405 | France | July 26, 1909 |